UNITED STATES PATENT OFFICE.

R. H. SMITH, OF CINCINNATI, OHIO.

ROOFING-CEMENT.

Specification forming part of Letters Patent No. 16,457, dated January 20, 1857.

*To all whom it may concern:*

Be it known that I, R. H. SMITH, of the city of Cincinnati, in the county of Hamilton and State of Ohio, have invented a new and useful Improvement in Compound Cements for Roofing and similar purposes, such as painting; and I do hereby declare that the following is a full and exact description of the material used and mode of compounding, mixing, and applying the cement to the purposes intended and mentioned.

The object of my invention is so to prepare a cement suitable for roofing and other purposes that it will not require the aid of fire in its preparation, be capable of expanding and contracting under the influence of the atmosphere without becoming ruptured or otherwise injured, dry speedily, form as a paint an efficient protection to the article coated against the action of the weather, and speedily lose its offensive smell, such as arises from the use of the coal-tar, &c., and which has been the main drawback to other cements in which it has been a chief ingredient. This cement is formed by mixing and preparing in the following proportions, or any other substantially the same, the following ingredients, all of which are mixed in their cold or natural state and applied to roofing or other purposes in the same condition, to wit: To twenty-one parts of coal-tar add one part virgin-rubber solution—that is to say, rubber dissolved in turpentine. To twenty-eight parts of coal-tar add one part of gum-shellac dissolved in alcohol. To twenty-one parts of coal-tar add one part of boiled linseed-oil. To twenty-eight parts of coal-tar add one part of common molasses. Each of these solutions are well stirred in and mixed with the coal-tar, after which they are allowed to stand for at least thirty-six hours, when they may all be mixed together and thoroughly incorporated with each other, when the mixture will be ready to receive the compound. I use as a drier, which consists of certain ingredients to be hereinafter named, and compounded in the following manner, to wit: To six parts of quicklime pulverized add one part of pulverized gypsum. To thirty parts of quicklime pulverized add one part of yellow ocher. To twenty-four parts of quicklime pulverized add one part of litharge. These articles, like the former, are each thoroughly mixed and afterward incorporated with each other, so as to form but one mixture. This accomplished, the cement as required for use can be made by mixing with every four gallons of the first compound mixture, one quart of the drying compound, which on being intimately mixed with each other forms the cement, which is then ready to be applied either as a roofing by spreading it over the surface in a thin layer and then smalting it with sand, or as a paint by applying it in the usual manner.

The proportion of the drying compound may be slightly increased or diminished to suit the climate in which it is intended to be used; but for general purposes the aforesaid proportions will be found to suit the greater portion of this country.

The uses of the different articles composing the cement as I conceive are as follows, to wit: the coal-tar for giving it a body, the virgin rubber and shellac solution for strengthening and giving it elasticity under different temperatures. The linseed-oil boiled seems to protect it from humidity and makes it compact, yet gives it freedom to expand and contract without breaking. The molasses acts as a deoderizer. By the use of molasses in two or three weeks at the farthest after the cement has been applied it has been found that all offensive smell is destroyed or so neutralized as not to be at all offensive, which is one of the strong reasons why this cement is adapted to the purposes of roofing dwellings, &c., and which hitherto has been the greatest objection to the use of the ordinary cement or composition in use containing coal-tar, as they emit an offensive smell for twelve or eighteen months after they have been applied. The compound or substances to be used as driers are to solidify the cement as soon as practicable.

I do not claim any or either of the above-mentioned ingredients when used of themselves or when combined with each other broadly; but What I do claim is—

A cement formed by materials prepared in the manner and in the proportions set forth in my specification, whereby a cement may be made and applied to roofing and other purposes without the aid of fire to render it fluid, as heretofore, and by which the offensive smell arising from the use of coal-tar, &c., is neutralized, as hereinbefore described.

R. H. SMITH.

Witnesses:
MARTIN BENSON,
CHARLES H. FOX.